United States Patent Office 3,523,141
Patented Aug. 4, 1970

3,523,141
METHOD FOR INHIBITING POLYMERIZATION OF CONJUGATED DIENES
Tatsuo Sakashita, Kamakura-shi, Japan, assignor to The Japanese Geon Co., Ltd.
No Drawing. Filed Apr. 18, 1968, Ser. No. 722,190
Claims priority, application Japan, Apr. 26, 1967, 42/26,243
Int. Cl. C07c 7/08, 7/18; B01d 3/34
U.S. Cl. 260—666.5         9 Claims

ABSTRACT OF THE DISCLOSURE

Inhibitors against polymerization of $C_4$–$C_5$ conjugated dienes in polar solvent solution consist of 0.01–10% by weight in the solvent of a compound from the group of tert.-mercaptan, alkyl nitrite, thiodipropionitrile, N-nitroso-N-methyl aniline, and a nitro naphthalene. Isoprene in DMF, tested for 24 hours at 155° C., showed excellent results with any of the single substances listed, and some synergism for combinations of two inhibitors in which the second is another of those listed, or a previously known inhibitor.

---

This invention relates to a method of reducing the tendency of conjugated dienes, e.g., butadiene, isoprene and/or 1,3-pentadiene, to polymerize in solutions exposed to elevated temperatures.

The term "1,3-pentadiene" used herein should be understood to mean both cis- and trans-1,3-pentadienes and the term "butadiene" used herein should be understood to mean 1,3-butadiene.

It is known to use the techniques of solvent absorption and extractive distillation in processes for separating the valuable industrial raw material butadiene in good yield and high purity from a butadiene-containing gas mixture such as the so-called $C_4$-hydrocarbon fraction whose chief constituents are, for example, n-butane, isobutane, n-butenes, isobutene, butadiene, etc. Further it is well known to use the same techniques in processes for separating isoprene or 1,3-pentadiene in good yield and high purity from isoprene and/or 1,3-pentadiene containing gas mixture such as the so-called $C_5$-hydrocarbon fractions whose chief constituents are, for example, isoprene, 1,3-pentadiene, n-pentane, isopentane, pentene-1, pentene-2, 2-methyl-butene-1, 2-methyl-butene-2, cyclopentadiene, etc. It is also known that typical solvents used in these processes include dimethyl formamide (DMF), N-methylpyrrolidone, acetonitrile and acetone.

In the operation of these processes, however, the solvent containing the conjugated diene, e.g., butadiene, isoprene or 1,3-pentadiene, is necessarily exposed to elevated temperatures, e.g. from 80° to 150° or even higher, with the consequence that the conjugated diene in the solvent tends to polymerize. As a result, difficulties arise from the clogging of the apparatus with the separating polymer and the formation of a polymeric coating on the inside wall of the apparatus, and continuous operation over an extended period of time becomes practically impossible.

At a room temperature or lower, the polymerization of conjugated dienes may be prevented to some extent by addition of a conventionally known polymerization inhibitor, e.g., hydroquinone, 4-ter.-butyl-catechol, β-naphthylamine, Methylene Blue, sodium nitrite, etc. However, the polymerization inhibitors as named above are not satisfactory to prevent the polymerization of the conjugated dienes when these dienes are subjected to heat treatment at a relatively high temperature, say, 80°–150° C. or even higher over a long period of time.

An object of the present invention is to provide a method of preventing the polymerization of conjugated dienes in solution at elevated temperatures thereby to overcome the difficulties such as hereinabove described during the separation of conjugated dienes from gas mixtures containing conjugated dienes by means of the solvent absorption or extractive distillation process. Other objects of the invention will be obvious from the contents of the specification hereinafter disclosed.

I have found that the corporation of at least one compound selected from aliphatic tertiary mercaptan, β,β'-thiodipropionitrile, N-nitroso-N-methylaniline, alkyl nitrite, and nitronaphthalene compound into a conjugated diene-containing solution reduces the tendency of the conjugated diene to polymerize. In particular, we have found that little or no polymerization of butadiene, isoprene or 1,3-pentadiene occurs when the solution is exposed to elevated temperatures. Further, the invention enables us to prevent the polymerization of butadiene, isoprene or 1,3-pentadiene even when water is present in a solution containing these conjugated dienes. Accordingly, the present invention provides a method of reducing the tendency of butadiene, isoprene and/or 1,3-pentadiene to polymerize in solutions exposed to elevated temperatures, which comprises adding to the solution, as polymerization inhibitor, at least one of the above-named compounds. The invention also include a butadiene, isoprene or 1,3-pentadiene solution containing, as polymerization inhibitor, at least one of the above-named compounds.

The invention is particularly applicable to butadiene, isoprene or 1,3-pentadiene solution wherein the solvent is a typical solvent used in the separation of butadiene, isoprene or 1,3-pentadiene from butadiene, isoprene or 1,3-pentadiene containing gas mixtures by solvent absorption or extractive distillation as discussed hereinbefore. By means of the invention, it is, therefore, possible to separate butadiene, isoprene or 1,3-pentadiene stably and continuously over an extended period of time from the mixed gases containing butadiene, isoprene or 1,3-pentadiene by means of the solvent absorption or extractive distillation processes, without employing apparatus made from such expensive materials as stainless steels. Although the amount of the polymerization inhibitor compound used is capable of wide variation depending upon such factors as the class of solvent, the water content of the solvent, operating conditions and the presence or absence of iron rust, in general, the objectives of this invention can be achieved by the incorporation of about 0.01–10%, and preferably 0.05–5%, based on the weight of the solvent. It is, of course, possible to add these compounds in amounts in excess of the foregoing range, as no particular detrimental effects are observed.

Suitable aliphatic tertiary mercaptans can be generically expressed by the chemical formula

wherein $n$ is a number of 0–10. Especially preferred as the aliphatic tertiary mercaptan are tertiary butylmercaptan, tertiary lauryl mercaptan, etc. Suitable alkyl nitrite can be expressed by the general formula RONO, wherein R is an alkyl group having 3 to 8 carbon atoms. Typical compounds are, for example, isopropyl nitrite, isoamyl nitrite, octyl nitrite, etc. Nitronaphthalene compounds used herein can be expressed by the general formula

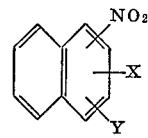

wherein X and Y, same or different, are —H, —OH, —$CH_3$, $NH_2$ or —$NO_2$. Typical compounds are, for example, α-nitronaphthalene, β-nitronaphthalene, 1,8-dinitronaphthalene, 1-nitro-2-methylnaphthalene, nitro-α-naphthol, 2,4-dinitro-1-naphthol, 4-nitro-1-naphthylamine, 4-nitro-2-aminonaphthol, etc. Other compounds useful as a polymerization inhibitor according to the invention are β,β'-thiodipropionitrile, N-nitroso-N-methyl aniline and naphthalene.

The above-specified polymerization inhibitors may be used singly or in combination. It is also possible to use these polymerization inhibitors together with a conventionally known polymerization inhibitor such as furfural, benzaldehyde or aromatic nitro compound, thereby to have increased effect for the prevention of undesired polymerization.

The effect of the polymerization inhibitor according to the invention is further promoted by the conjoint presence in the system of substances which are well-known for use as polymerization inhibitors or stabilizers for unsaturated compounds. Presumably, this is the result of a synergistic action between these substances and the additive use in accordance with the present invention. Known substances of this class include, for example, Methylene Blue, sodium nitrite, hydroquinone, sulphur, phenolic compounds such as tertiary butyl catechol, and aromatic amines such as β-naphthylamine. The conventional amounts or less of such substances may be used.

It is to be noted that the solvent solutions containing butadiene, isoprene and/or 1,3-pentadiene can be equally prevented from polymerization by the incorporation of the polymerization inhibitor according to the present invention. Further, their polymerization inhibiting effect does not decrease at all even in the presence of acetylenes such as methyl acetylene, vinyl acetylene, propyl acetylene, or allenes such as 1,2-butadiene. More specifically, polymer formation can be inhibited by adding the polymerization inhibitor to a solution containing the acetylenes or allenes in addition to butadiene, isoprene and/or 1,3-pentadiene.

The polymerization inhibitors according to the invention are also effective in the presence of saturated hydrocarbons such as butane, n-pentane and isopentane, monoolefins such as butene-1, isobutene, pentene-1, pentene-2, 2-methylbutene-1, 2-methylbutene-2, and cyclopentadiene. Accordingly, the incorporation of these polymerization inhibitors to the so-called $C_4$- or $C_5$-hydrocarbon fraction is completely effective to undesired polymerization of butadiene or isoprene and 1,3-pentadiene.

Now the present invention will be explained in detail in conjunction with the following examples.

EXAMPLE 1

A glass tube was charged with dimethyl formamide and the various compounds in the amounts hereinafter indicated. Butadiene was introduced to a gauge pressure of 5.5 kg./cm.$^2$, while maintaining a temperature of 155° C. On examining the state of the solutions 24 hours later, the following results were obtained.

| Additive | State of Solution |
| --- | --- |
| (1) None | Polymer separated. |
| (2) Sodium nitrite (1,000 p.p.m.) | Turbid. |
| (3) t-Butylmercaptan (5 vol. percent) | Transparent. |
| (4) β,β'-Thiodipropionitrile (5 vol. percent). | Do. |
| (5) N-nitroso-N-methylaniline (5 vol. percent). | Do. |
| (6) Isoamyl nitrite (5 vol. percent) | Practically transparent. |
| (7) α-Nitronaphthalene (5,000 p.p.m.) | Do. |
| (8) 2,4-dinitro-1-naphthol (5,000 p.p.m.) | Transparent. |

EXAMPLE 2

An autoclave having iron rust on its inside wall was charged with dimethyl formamide and the various compounds in the amounts hereinafter indicated. While maintaining a temperature of 155° C. in a state in which the mixtures were in contact with the iron rust, butadiene was introduced to a gauge pressure of 6 kg./cm.$^2$. On examining the state of the solutions 48 hours later, the following results were obtained.

| Additive | State of Solution |
| --- | --- |
| (1) None | Large amount of polymer separated. |
| (2) t-Butylmercaptan (5 vol. percent) | Slightly turbid. |
| (3) t-Laurylmercaptan (5 vol. percent) | Practically transparent. |
| (4) β,β'-Thiodipropionitrile (5 vol. percent). | Slightly turbid. |
| (5) N-nitroso-N-methylaniline (5 vol. percent). | Practically transparent. |
| (6) Isoamylnitrite (5 vol. percent) | Do. |
| (7) β-Dinitronaphthalene (5,000 p.p.m.) | Transparent. |
| (8) 2,4-dinitro-1-naphthol (5,000 p.p.m.) | Do. |
| (9) 4-nitro-1-naphthylamine (5,000 p.p.m.). | Practically transparent. |
| (10) 2-methyl-1-nitronaphthalene (5,000 p.p.m.). | Do. |

EXAMPLE 3

An autoclave having iron rust present on its inside wall was charged with dimethyl formamide and the various compounds in the amounts hereinafter indicated. Butadiene was introduced to a gauge pressure of 6 kg./cm.$^2$, while maintaining a temperature of 155° C. The mixtures were in contact with iron rust. On examining the state of the solution 48 hours later, the following results were obtained.

| Additive | State of Solution |
| --- | --- |
| (1) None | Large amount of polymer separated. |
| (2) Sodium nitrite (1,000 p.p.m.) | Turbid. |
| (3) Sulphur (500 p.p.m.) | Polymer separated. |
| (4) Methylene Blue (500 p.p.m.) | Do. |
| (5) β-Naphthylamine (500 p.p.m.) | Do. |
| (6) 4-t-butylcatechol (500 p.p.m.) | Do. |
| (7) t-Butylmercaptan (5 vol. percent), sodium nitrite (1,000 p.p.m.). | Transparent. |
| (8) t-Laurylmercaptan (5 vol. percent), 4-t-butylcatechol (500 p.p.m.). | Do. |
| (9) β,β'-Thiodipropionitrile (5 vol. percent), methylene blue (500 p.p.m.). | Do. |
| (10) N-nitroso-N-methylaniline (5 vol. percent), sulphur (500 p.p.m.). | Do. |
| (11) Isoamyl nitrite (5 vol. percent), β-naphthylamine (500 p.p.m.). | Practically transparent. |
| (12) β-Dinitronaphthalene (5,000 p.p.m.), 4-t-butylcatechol (1,000 p.p.m.). | Transparent. |
| (13) α-Nitronaphthalene (5,000 p.p.m.), Sodium nitrite (1,000 p.p.m.). | Do. |

EXAMPLE 4

The same conditions as given in Example 3 were used to evaluate the joint use of two compounds selected from the polymerization inhibitors of the present invention. The results are set forth below.

| Additive | State of Solution |
| --- | --- |
| (1) t-Butylmercaptan (2.5 vol. percent,) β,β'-Thiodipropionitrile (2.5 vol. percent). | Practically transparent. |
| (2) t-Laurylmercaptan (2.5 vol. percent), Isoamyl nitrite (2.5 vol. percent). | Do. |
| (3) β,β'-Thiodipropionitrile (2.5 vol. percent), Isoamyl nitrite (2.5 vol. percent). | Do. |
| (4) N-nitro-N-methylaniline (2.5 vol. percent), β,β'-Thiodipropionitrile (2.5 vol. percent). | Do. |
| (5) 2,4-dinitro-1-naphthol (3,000 p.p.m.), Isoamyl nitrite (2.5 vol percent). | Transparent. |
| (6) α-Nitronaphthalene (3,000 p.p.m.), t-Butylmercaptan (2.5 vol. percent). | Do. |
| (7) β-Dinitronaphthalene (3,000 p.p.m.), N-nitroso-N-methylaniline (2.5 vol. percent). | Do. |

EXAMPLE 5

An autoclave having iron rust on its inside wall was charged with dimethyl formamide and the various compounds in the amounts hereinafter indicated. While maintaining a temperature of 155° C. in a state in which the mixtures were in contact with the iron rust, isoprene was introduced to a gauge pressure of 3 kg./cm.$^2$. On examining the state of the solutions 24 hours later, the following results were obtained.

| Additive | State of Solution |
|---|---|
| (1) None | Large amount of polymer separated. |
| (2) Sodium nitrite (1,000 p.p.m.) | Polymer separated. |
| (3) Sulphur (1,000 p.p.m.) | Large amount of polymer separated. |
| (4) Methylene blue (1,000 p.p.m.) | Polymer separated. |
| (5) 4-t-butylcatechol (1,000 p.p.m.) | Do. |
| (6) t-Butylmercaptan (5 vol. percent) | Transparent. |
| (7) β,β'-Thiodipropionitrile (5 vol. percent), sodium nitrite (1,000 p.p.m.). | Do. |
| (8) t-Laurylmercaptan (5 vol. percent), methylene blue (1,000 p.p.m.). | Practically transparent. |
| (9) N-nitroso-N-methylaniline (5 vol. percent). | Transparent. |
| (10) Isoamyl nitrite (5 vol. percent), sulphur (1,000 p.p.m.). | Slightly turbid. |
| (11) 2,4-dinitro-1-naphthol (10,000 p.p.m.) | Transparent. |
| (12) β-Dinitronaphthalene (10,000 p.p.m.), 4-t-butylcatechol (1,000 p.p.m.). | Do. |

EXAMPLE 6

An autoclave having iron rust on its inside wall was charged with dimethyl formamide and the various compounds in the amounts hereinafter indicated. While maintaining a temperature of 155° C. in a state in which the mixtures were in contact with the iron rust, 1,3-pentadiene (which consists of 67% by weight of trans-1,3-pentadiene and 33% by weight of cis-1,3-pentadiene) was introduced to a gauge pressure of 2.5 kg./cm.² After 24 hours, the state of the solutions were observed with the following results.

| Additive | State of solution |
|---|---|
| (1) None | Large amount of polymer separated. |
| (2) Sodium nitrite (1,000 p.p.m.) | Polymer separated. |
| (3) Sulphur (1,000 p.p.m.) | Do. |
| (4) Methylene blue (1,000 p.p.m.) | Small amount of polymer separated. |
| (5) 4-t-butylcatechol (1,000 p.p.m.) | Large amount of polymer separated. |
| (6) t-Butylmercaptan (5 vol. percent) | Practically transparent. |
| (7) β,β'-Thiodipropionitrile (5 vol. percent), 4-t-butylcatechol (1,000 p.p.m.). | Slightly turbid. |
| (8) Isoamyl nitrite (5 vol. percent), 4-t-butylcatechol (1,000 p.p.m.). | Practically transparent. |
| (9) N-nitroso-N-methylaniline (5 vol. percent), sulphur (1,000 p.p.m.). | Do. |
| (10) β-Dinitronaphthalene (10,000 p.p.m.) 4-t-butylcatechol (1,000 p.p.m.). | Transparent. |
| (11) 2,4-dinitro-1-naphthol (10,000 p.p.m.) | Practically transparent. |

EXAMPLE 7

The autoclave used in the preceding examples was charged with dimethyl formamide and various additives in the amounts hereinafter indicated. While maintaining a temperature of 155° C., the hydrocarbon mixture consisting of 40% by volume of butadiene, 30% by volume of isoprene and 30% by volume of 1,3-pentadiene (which consists of 67% by weight of trans-1,3-pentadiene and 33% by weight of cis-1,3-pentadiene) was introduced to a gauge pressure of 4 kg./cm.² After 48 hours, the state of the solutions were observed with the following results.

| Additive | State of solution |
|---|---|
| (1) None | Large amount lf polymer separated. |
| (2) Sodium nitrite (1,000 p.p.m.) | Polymer separated. |
| (3) 4-t-butylcatechol (1,000 p.p.m.) | Do. |
| (4) Sulphur (1,000 p.p.m.) | Do. |
| (5) t-Butylmercaptan (5 vol. percent) | Transparent. |
| (6) β,β'-Thiodipropionitrile (5 vol. percent), sodium nitrite (1,000 p.p.m.) | Practically transparent. |
| (7) Isoamyl nitrite (5 vol. percent), 4-t-butylcatechol (1,000 p.p.m.). | Slightly turbid. |
| (8) N-nitroso-N-methylaniline (5 vol. percent). | Transparent. |
| (9) β-Dinitronaphthalene (5,000 p.p.m.), 4-t-butylcatechol (1,000 p.p.m.). | Practically transparent. |
| (10) 2,4-dinitro-1-naphthol (5,000 p.p.m.) | Do. |

EXAMPLE 8

An autoclave having iron rust on its inside wall was charged with N-methylpyrrolidone and various additives in the amounts hereinafter indicated. While maintaining a temperature of 120° C., butadiene was introduced to a gauge pressure of 5.5 kg./cm.² After 24 hours, the state of the solutions were observed with the following results.

| Additive | State of Solution |
|---|---|
| (1) None | Large amount of polymer separated. |
| (2) Sodium nitrite (1,000 p.p.m.) | Turbid. |
| (3) Sulphur (1,000 p.p.m.) | Polymer separated. |
| (4) Methylene blue (1,000 p.p.m.) | Do. |
| (5) 4-t-butylcatechol (1,000 p.p.m.) | Do. |
| (6) t-Butylmercaptan (5 vol. percent) | Transparent |
| (7) β,β'-Thiodipropionitrile (5 vol. percent, sodium nitrite (1,000 p.p.m.). | Do. |
| (8) Isoamyl nitrite (5 vol. percent), 4-t-butylcatechol (1,000 p.p.m.). | Do. |
| (9) N-nitroso-N-methylaniline (5 vol. percent). | Do. |
| (10) β-Dinitronaphthalene (5,000 p.p.m.), sulphur (1,000 p.p.m.). | Practically transparent. |
| (11) 2,4-dinitro-1-naphthol (5,000 p.p.m.) | Transparent. |

EXAMPLE 9

An autoclave having iron rust on its inside wall was charged with acetonitrile and various additives in the amounts hereinafter indicated. While maintaining a temperature of 120° C., isoprene was introduced to a gauge pressure of 7 kg./cm.² After 24 hours, the state of the solutions were observed with the following results.

| Additive | State of Solution |
|---|---|
| (1) None | Large amount of polymer separated. |
| (2) Sodium nitrite (1,000 p.p.m.) | Polymer separated. |
| (3) 4-t-butylcatechol (1,000 p.p.m.) | Turbid. |
| (4) t-Butylmercaptan (5 vol. percent) | Practically transparent. |
| (5) β,β'-Thiodipropionitrile (5 vol. percent), sodium nitrite (1,000 p.p.m.). | Slightly turbid. |
| (6) Isoamylnitrite (5 vol. percent), 4-t-butylcatechol (1,000 p.p.m.). | Do. |
| (7) N-nitroso-N-methylaniline (5 vol. percent) | Transparent. |
| (8) 2,4-dinitro-1-naphthol (5,000 p.p.m.) | Do. |

EXAMPLE 10

An autoclave having iron rust on its inside wall was charged with dimethyl formamide and various additives in the amounts hereinafter indicated. While maintaining a temperature of 155° C., the $C_5$-hydrocarbon fraction consisting of the following compositions was introduced to a gauge pressure of 3 kg./cm.²

| | Mol percent |
|---|---|
| n-Pentane | 24.35 |
| i-Pentane | 15.02 |
| Isoprene | 15.08 |
| 2-methylbutene-(1) | 6.71 |
| Pentene-(1) | 5.61 |
| Trans-1,3-pentadiene | 5.35 |
| Cyclopentadiene | 4.58 |
| Trans-pentene-(2) | 3.83 |
| 2-methylbutene-(2) | 3.32 |
| Cis-1,3-pentadiene | 3.06 |
| Cyclopentene | 2.61 |
| Cis-pentene-(2) | 2.27 |
| 1,4-pentadiene | 1.46 |
| 2-methylbutene-(1) | 1.13 |
| Cyclopentane | 0.96 |

Acetylenes (α-acetylene) 600 p.p.m.

The mixture were in contact with iron dust. After 48 hours, the state of the solutions were observed with the following results.

| Additive | State of solution |
|---|---|
| (1) None | Large amount of polymer separated |
| (2) t-Dodecylmercaptan (5 vol. percent) | Practically transparent |
| (3) β,β'-Thiodipropionitrile (5 vol. percent), methylene blue (1,000 p.p.m.). | Slightly turbid. |
| (4) Isoamyl nitrite (5 vol. percent), 4-t-butylcatechol (1,000 p.p.m.). | Do. |
| (5) N-nitroso-N-methylaniline (5 vol. percent), sodium nitrite (1,000 p.p.m.). | Practically transparent. |
| (6) 2,4-dinitro-1-naphthol (5,000 p.p.m.) | Transparent. |

EXAMPLE 11

An autoclave having iron rust on its inside wall was charged with dimethyl formamide and various additions in the amounts hereinafter indicated. While maintaining a temperature of 155° C., the gas mixtures consisting of 90% by volume of butadiene and 10% by volume of vinyl acetylene was introduced to a gauge pressure of 5 kg./cm.$^2$. After 48 hours, the state of the solutions were observed with the following results.

| Additive | State of solution |
|---|---|
| (1) None | Large amount of polymer separated. |
| (2) t-Butylmercaptan (5 vol. percent) | Transparent. |
| (3) β,β'-thiodipropionitrile (5 vol. percent) | Practically transparent. |
| (4) Isoamyl nitrite (5 vol. percent) | Slightly turbid. |
| (5) N-nitroso-N-methylaniline (5 vol. percent) | Practically transparent. |
| (6) 2,4-dinitro-1-naphthol (5,000 p.p.m.) | Transparent. |

What I claim is:

1. A method of reducing the tendency of a conjugated diene to polymerize in polar solvent solution exposed to elevated temperatures, which comprises adding to the solution, as polymerization inhibitor, a compound selected from the group consisting of aliphatic tertiary mercaptan, β,β'-thiodipropionitrile, N-nitroso-N-methyl aniline, alkyl nitrite and nitro-naphthalene compound in amount of 0.01 to 10% by weight based on the solvent of the solution.

2. A method according to claim 1, wherein said conjugated diene is butadiene, isoprene, 1,3-pentadiene or the mixture thereof.

3. A method according to claim 1, wherein said conjugated diene is in the form of a $C_4$- or $C_5$-hydrocarbon fraction.

4. A method according to claim 1, wherein said solution comprises a polar solvent selected from dimethyl formamide, N-methyl pyrrolidone, acetonitrile and acetone.

5. A method according to claim 1, wherein said aliphatic tertiary mercaptan is a compound of the general formula $$CH_3(CH_2)_nC(CH_3)_2SH$$

wherein $n$ is a number of 0–10.

6. A method according to claim 1, wherein said alkyl nitrite is a compound of the general formula $$RONO$$

wherein R is a $C_{3-8}$-alkyl.

7. A method according to claim 1, wherein said nitro-naphthalene compound is a compound of the general formula

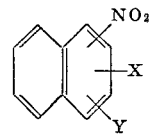

wherein X and Y, same or different, are —H, —OH, —$CH_3$, —$NH_2$ or —$NO_2$.

8. A method according to claim 1, wherein, in addition to the said polymerization inhibitor, there is also added a known inhibitor for unsaturated compounds.

9. A method according to claim 1, wherein the known inhibitor is sodium nitrate, Methylene Blue, sulphur, tertiary butyl catechol, β-naphthyl amine, furfural, benzaldehyde or aromatic nitro compound.

References Cited

UNITED STATES PATENTS

| | | | |
|---|---|---|---|
| 3,388,041 | 10/1945 | Craig | 203—9 |
| 2,730,489 | 1/1956 | Lewis | 203—9 |
| 2,809,155 | 10/1957 | Buehler | 203—9 |
| 2,900,421 | 8/1959 | Kharasch et al. | 293—9 X |
| 3,309,412 | 3/1967 | Sakuragi et al. | 260—666.5 |
| 3,340,160 | 9/1967 | Waldby | 252—405 X |
| 3,405,189 | 10/1968 | Sakuragi et al. | 260—666.5 |
| 3,407,240 | 10/1968 | Sakashita et al. | 260—666.5 |

FOREIGN PATENTS 20,281  1968  Japan.

DELBERT E. GANTZ, Primary Examiner

K. E. SCHMITKONS, Assistant Examiner

U.S. Cl. X.R.

203—7, 9, 51, 58, 60, 62; 208—48; 252—405; 260—681.5